(12) United States Patent
Dang et al.

(10) Patent No.: US 8,536,299 B2
(45) Date of Patent: Sep. 17, 2013

(54) RIGID-ROD COPOLYMER COMPOSITIONS AND THE POLYMERIC FIBERS FABRICATED FROM THOSE COMPOSITIONS FOR ENHANCED FLAME RESISTANCE

(75) Inventors: Thuy D. Dang, Centerville, OH (US); Zongwu Bai, Beavercreek, OH (US); Narayanan Venkat, Beavercreek, OH (US); Alexander B. Morgan, Kettering, OH (US)

(73) Assignee: University of Dayton, Dayton, OH (US)

( * ) Notice: Subject to any disclaimer, the term of this patent is extended or adjusted under 35 U.S.C. 154(b) by 739 days.

(21) Appl. No.: 12/329,662

(22) Filed: Dec. 8, 2008

(65) Prior Publication Data

US 2010/0145004 A1    Jun. 10, 2010

(51) Int. Cl.
*C08G 63/02*     (2006.01)

(52) U.S. Cl.
USPC ........... 528/272; 528/289; 528/291; 528/308; 528/401; 528/408

(58) Field of Classification Search
USPC ................... 528/183, 99, 191, 193, 272, 289, 528/291, 308, 401, 408
See application file for complete search history.

(56) References Cited

U.S. PATENT DOCUMENTS

| | | | |
|---|---|---|---|
| 4,939,215 A | 7/1990 | Mueller et al. | |
| 5,041,522 A | 8/1991 | Dang et al. | |
| 5,075,419 A * | 12/1991 | Vora et al. | 528/353 |
| 5,106,940 A | 4/1992 | Dang et al. | |
| 5,233,821 A | 8/1993 | Weber, Jr. et al. | |
| 6,057,417 A | 5/2000 | Arnold et al. | |
| 6,746,759 B2 | 6/2004 | Harris et al. | |
| 7,052,793 B2 | 5/2006 | Formato et al. | |
| 7,265,198 B2 | 9/2007 | Dang et al. | |
| 2003/0149207 A1* | 8/2003 | Walter et al. | 526/259 |
| 2004/0152862 A1 | 8/2004 | Takasaki et al. | |
| 2005/0249961 A1* | 11/2005 | Saitoh et al. | 428/474.4 |

FOREIGN PATENT DOCUMENTS

| | | |
|---|---|---|
| CA | 1178394 | 11/1984 |
| EP | 0264678 | 4/1988 |
| EP | 0990673 | 4/2000 |
| EP | 0997488 | 5/2000 |
| FR | 2595362 | 9/1987 |
| GB | 2211193 | 6/1989 |
| JP | 2003-251704 | 9/2003 |
| JP | 2005-322615 | 11/2005 |
| JP | 2006-022433 | 1/2006 |
| JP | 2006-143943 | 6/2006 |
| WO | 2007/148384 | 12/2007 |

OTHER PUBLICATIONS

Field, L. et al., "Organic disulfides and related substances. XXX. Preparations and reactions of mercaptoterephthalic acids and derivatives," *The Journal of Organic Chemistry*, 35 (11), pp. 3647-3655.

(Continued)

*Primary Examiner* — Michael L Leonard
(74) *Attorney, Agent, or Firm* — Thompson Hine L.L.P.

(57) ABSTRACT

Rigid-rod copolymer compositions incorporating PBO (poly (p-phenylenebenzobisoxazole)), DiOH-PBO (poly(2,5-dihydroxy-1,4-phenylenebenzobisoxazole), DiOH-PBI (poly(2, 5-dihydroxy-1,4-phenylenebenzobisimidazole)), DiOH-PyBI (poly(2,5-dihydroxy-1,4-phenylenepyridobisimidazole), PBZT (poly(p-phenylenebenzobisthiazole)) and its corresponding dihydroxy analogues attached to a flexibilizing hexafluoroisopropylidene linkage are described. Also described are their fabrication into fibers by a dry jet wet spinning technique and the measured fiber mechanical properties. The copolymer compositions are highly flame-resistant and have potential utility for fire-protective clothing.

29 Claims, 1 Drawing Sheet

(56) References Cited

OTHER PUBLICATIONS

Hsu, S. L-C. et al., "Synthesis and Characterization of Novel Aromatic Poly(imide-benzoxazole) Copolymers," *Journal of Polymer Science, Part A. Polymer Chemistry*, vol. 43, pp. 6020-6027 (2005).

PCT, Invitation to Pay Additional Fees and Partial International Search Report, 5 pages (May 10, 2010).

PCT, International Search Report and Written Opinion, International Application No. PCT/US2009/066690; 18 pages (Jun. 30, 2010).

\* cited by examiner

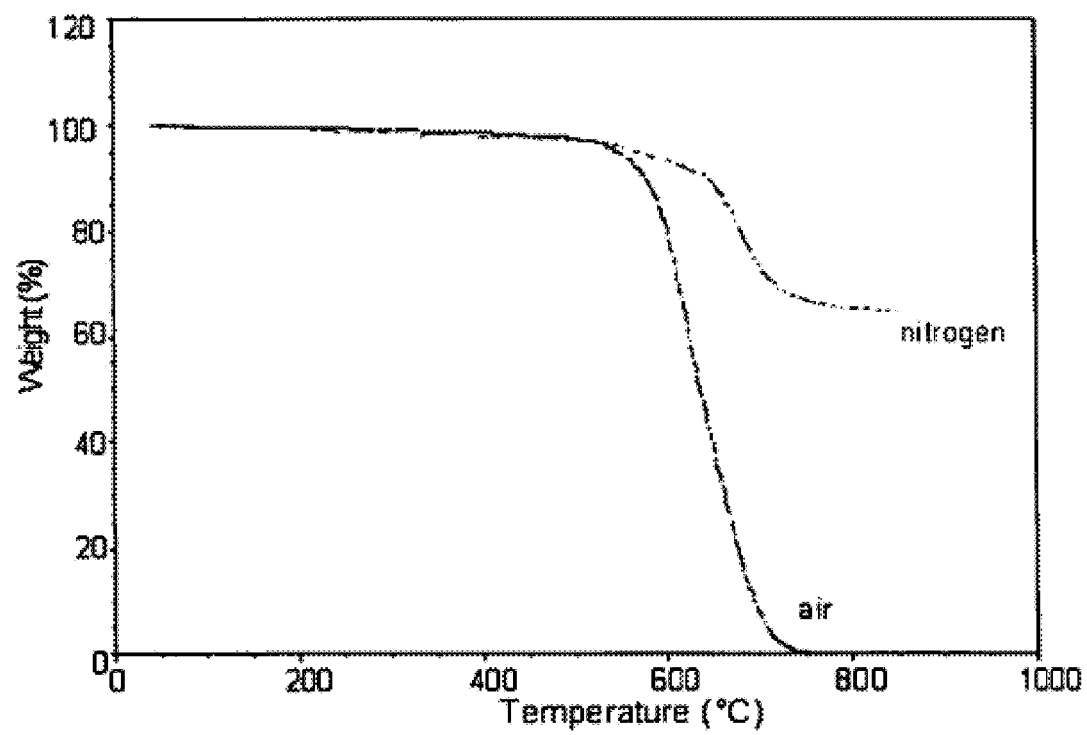

RIGID-ROD COPOLYMER COMPOSITIONS AND THE POLYMERIC FIBERS FABRICATED FROM THOSE COMPOSITIONS FOR ENHANCED FLAME RESISTANCE

STATEMENT REGARDING FEDERALLY SPONSORED RESEARCH OR DEVELOPMENT

This invention was made with government support under Contract No. FA8650-04-D2403 awarded by the United States Air Force. The government has certain rights in the invention.

BACKGROUND OF THE INVENTION

This invention relates to copolymers of a rigid-rod polymer unit such as poly(p-phenylenebenzobisoxazole) with a flexible backbone unit based on the hexafluoroisopropylidene group. Also described are copolymers containing the rigid-rod polymer unit poly(2,5-dihydroxy-1,4-phenylenebenzobisoxazole) with a flexible copolymer unit containing the hexafluoro-isopropylidene group in its backbone.

The rigid-rod copolymers described herein will also extend to poly(p-phenylene-benzobisthiazole) (PBZT) and poly(p-phenylenebenzobisimidazole) (PBI) copolymer compositions containing the flexibilizing hexafluoroisopropylidene units as well as to the dihydroxy variants of the above.

Aromatic heterocyclic rigid-rod polymers, such as PBO are known to have unique mechanical properties and exceptional thermal and thermo-oxidative stabilities. The commercial version of the heat-treated PBO fiber, known as ZYLON™, is reported to exhibit measured tensile strength of 5.8 GPa and a tensile modulus of 270 GPa while it has an elongation at break as low as 2.5%. Nago, S., et al., JP 2003251704. The onset of decomposition temperature in air is ~650° C. and its thermal stability in an inert atmosphere clearly exceeds 700° C. Because of its outstanding attributes, ZYLON™ is utilized as a high performance material in a variety of applications such as protective clothing, sports and aerospace, to mention just a few. Specific examples include flame/heat-resistant fabrics, ballistic vests, balloons, satellites, sailcloth, yacht ropes, golf clubs and reinforcement for cement and for belts and tires. However, some instances of in-service failure/degradation of the ZYLON™ fibers have stimulated recent studies on the effects of environmental conditions such as moisture, heat, as well as UV-radiation on PBO fiber properties. Hydrolytic degradation of PBO due to exposure to moisture, especially in presence of residual acid, has been investigated. PBO fiber degradation mechanism due to exposure to UV radiation has also been a subject of scrutiny.

In recent years, PBO has also been evaluated in insulator substrates as fibers bonded to epoxy resins and in non-woven fabric-based battery separators as composite fibers incorporating semi-aromatic polyamide fibers. See Japan Tokkyo Koho 2006/022433 and 2005/022836. PBO has also been utilized in composite solid polymer electrolyte membranes as a porous polymer substrate interpenetrated with an ion-conducting material for electrochemical applications such as fuel cells. See U.S. Pat. No. 7,052,793. Fiber-reinforced thermoplastic composites with high tenacity have also been fabricated by impregnating ZYLON™ fibers with an ethylene-vinyl alcohol copolymer. Besides the formation of blends and composites involving PBO, some instances of copolymerization involving PBO have also been reported. Conjugated random copolymers of rigid-rod PBO with extended-rod poly(2,5-benzoxazole) (ABPBO) and 2,5-thienyl benzobisoxazole (PBOT) units have been synthesized for study of their optoelectronic properties.

Dihydroxy-pendant variations of rigid-rod PBO (DiOH-PBO); PBZT (poly(p-phenylenebenzobisthiazole)) (DiOH-PBZT) and the corresponding benzimidazole DiOH-PBI have been reported. See U.S. Pat. Nos. 5,041,522 and 5,016,940.

Thermoplastic polybenzoxazoles (6F-PBOs) derived from bis(3-amino-4-hydroxyphenyl)hexafluoropropane, incorporating wholly flexible polymer backbone are disclosed in the literature. They have been evaluated in a number of applications ranging from photo-resist compositions for electronic patterning to interlayer insulating dielectrics for micro-electronic applications and as flexible plastic substrates for liquid crystal displays. See WO 2007/148384 and U.S. Pat. No. 6,057,417. Thermoplastic 6F-copolymer compositions incorporating various aromatic as well as cycloaliphatic structural units have been reported by Hasegawa, T., Japan Kokai Tokkyo Koho 2006/143943. 6F-benzoxazole-imide copolymers derived from the thermal cyclodehydration of the poly(amic acid-hydroxyamide) precursors are also known. Hsu, S. L-C.; Luo, G-W.; Chen, H-T.; Chang, S-W., *J. Poly. Sci., Poly. Chem.*, 2005, 43, 6020.

SUMMARY OF THE INVENTION

In one embodiment, the copolymers include an aromatic heterocyclic rigid-rod polymer unit such as poly(p-phenylenebenzobisoxazole) (PBO) and a flexible copolymer unit based on benzobisoxazole with a hexafluoroisopropylidene (6F-PBO) group. The flexible copolymer unit is generally referred to as a 'kink' in the rigid-rod polymer structure such as PBO. In another embodiment, the rigid-rod copolymer compositions are based on PBO with 2,5-dihydroxy pendants as the rigid-chain unit (referred to as DiOH-PBO) and in this case too, the 'kink' is derived from the copolymer unit based on benzoxazole with a flexibilizing hexafluoro-isopropylidene (6F-PBO) group.

It is also an object of this invention to provide new, highly flame-resistant rigid-rod copolymer compositions with potential for incorporation into fire-protective garments for the first responders. The rationale is provided below.

Introduction of the flexibilizing hexafluoroisopropylidene units makes PBO fibers potentially suitable for protective clothing and fabric applications, especially from the viewpoint of flame resistance, while potentially reducing problems such as hydrolytic and UV instabilities, known to be associated with PBO fibers. In addition, the hexafluoroisopropylidene groups can potentially confer higher moisture/hydrolytic resistance to the benzoxazole polymer by enhancing the hydrophobicity of the backbone. The substitution of PBO by DiOH-PBO in the copolymer compositions can also potentially provide better flame resistance by further increasing the limiting oxygen index (LOI) and lowering the heat release capacity of PBO. In addition, DiOH-PBO structure can enhance stability to UV-radiation, via the excited state intra-molecular proton transfer (ESIPT) mechanism, inherent to such aromatic heterocyclics with intra-molecular hydrogen bonding.

Embodiments are also disclosed in which the flexibilizing unit is used in combination with PBZT and PyBI copolymers and their dihydroxy variants.

Accordingly, the copolymer in accordance with certain embodiments of the invention can be represented by the formulas A, B, C, and D

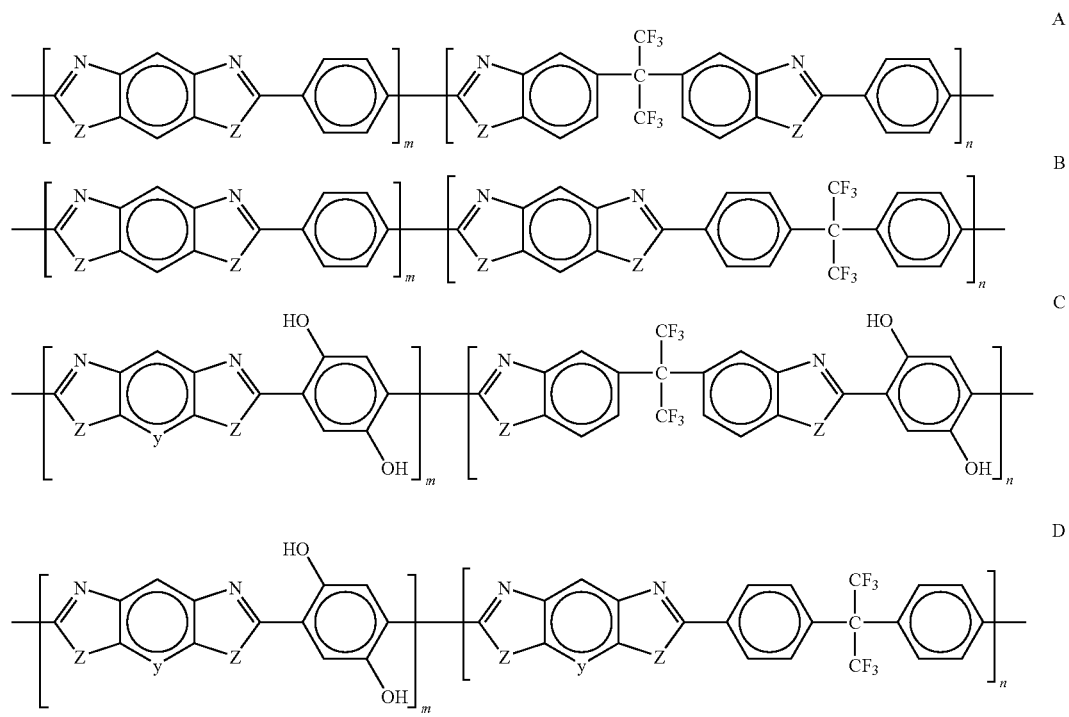

where Z is —O— or —S— in the case of formulas A and B; and Z is —O—, —S— or —NH— in the case of formulas C and D; and in formulas C and D, when Z is —NH—, y can be —C= or —N= and when Z is —O— or —S—, y is —C=; and when Z is —S—, the bisthiazole rings in the benzobisthiazole moieties may have a cis or a trans orientation (e.g., see Formulas 3A-3D); m is about 70 to 90 mole % and n is about 10 to 30 mole %.

BRIEF DESCRIPTION OF THE DRAWING

The FIGURE is a TGA analysis of a PBO-6F-PBO (90/10) copolymer in accordance with one embodiment of the disclosure.

DETAILED DESCRIPTION OF THE INVENTION

In one embodiment, random copolymer compositions involving PBO and 6F-PBO or DiOH-PBO and 6F-PBO have been synthesized. In another embodiment, random copolymer compositions involving PBO and hexafluoroisopropylidene phenylene units (6F-P units) have been synthesized.

Specifically, in one embodiment, the random PBO-6F-PBO copolymer composition is derived from terephthalic acid, 4,6-diaminoresorcinol dihydrochloride, and 2,2-bis(3-amino-4-hydroxyphenyl)hexafluoropropane. A similar copolymer composition, derived from terephthalic acid, 4,6-diaminoresorcinol dihydrochloride, and 2,2-bis(4-carboxyphenyl)hexafluoropropane as the comonomer in the place of 2,2-bis(3-amino-4-hydroxyphenyl)hexafluoropropane, is also described. The random DiOH-PBO-6F-PBO copolymer is derived from 2,5-dihydroxyterephthalic acid, 4,6-diaminoresorcinol dihydrochloride and 2,2-bis(3-amino-4-hydroxyphenyl) hexafluoropropane in one embodiment. All the polymers were synthesized by high temperature polycondensation in polyphosphoric acid (PPA) using the familiar "$P_2O_5$" adjustment method. Wolfe, J. F. *Encyclopedia of Polymer Science and Technology*: Wiley Interscience, New York, 1985, 11, 601.

The Formulas 1A-1D represent PBO random copolymers in accordance with one embodiment of the invention in which the number of PBO units (m) and the number of 6F-PBO or 6F-P units (n) is defined below. In general, m ranges from 70-90 mole % and n ranges from 10 to 30 mole %.

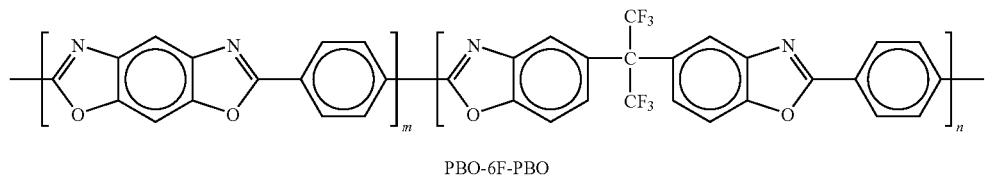

PBO-6F-PBO

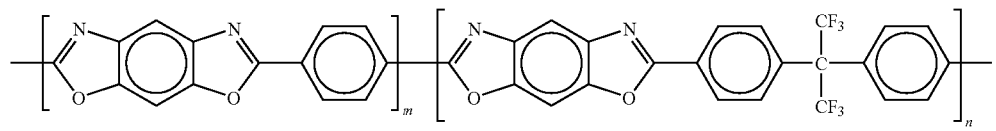

PBO-6F-DPPBO

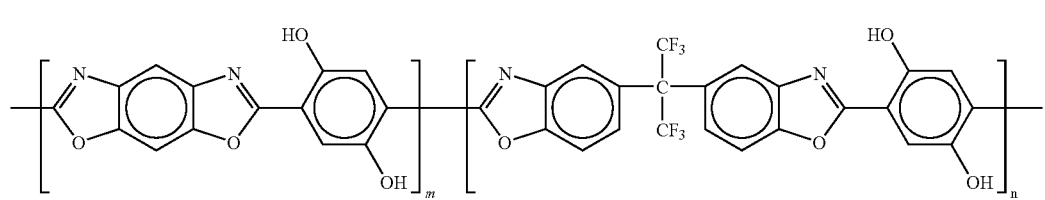

DiOH-PBO-6F-PBO

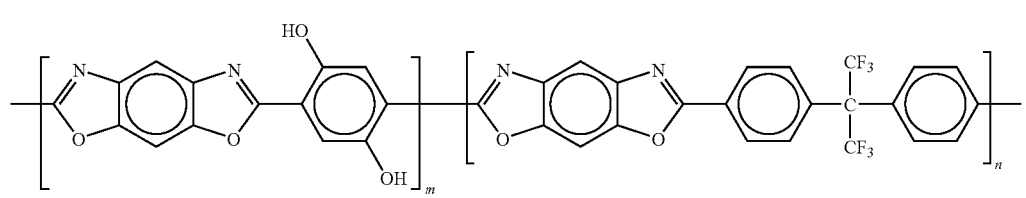

DiOH-PBO-6F-DPPBO

Though the embodiments illustrated in Formulas 1A-1D illustrate PBO-based rigid-rod copolymers, the application can be easily extended to dihydroxy pendent-benzobisimidazole (PBI)-based rigid-rod copolymers as well as pyridobisimidazole (PyBI)-based rigid-rod copolymers incorporating the flexibilizing hexafluoroisopropylidene units. The syntheses of these copolymers will be apparent to those familiar with the art. The flexibilizing monomer used in preparing PBI and PyBI copolymer is 2,2'-bis(3,4-diaminophenyl) hexafluoropropane has been reported in patent literature (R. H. Vora, P. N. Chen and J. D. Menczel, U.S. Pat. No. 5,075,419, 1991). A logical extension would also consider embodiments with the corresponding polybenzobisthiazole (PBZT-based) rigid-rod copolymers incorporating the hexafluoro-isopropylidene units. These manifestations can be considered from the viewpoint of their fundamental rigid-rod polymer properties as well as their intended applications such as flame resistance. The corresponding flexibilizing comonomer for PBZT, i.e., 2,2'-bis(3-amino-4-mercaptophenyl)hexafluoropropane can be prepared by synthetic routes generally known for the preparation of aromatic thiols (L. Field and P. R. Engelhardt, J. Org. Chem., 35(11), p. 3647, 1970). The chemical structures of the copolymer compositions based on PBI and PyBI are shown in Formulas 2A-2D and the copolymers of PBZT are shown in Formulas 3A-3D. In the latter formulas, m and n are defined in the same manner as in Formulas 1A-1D.

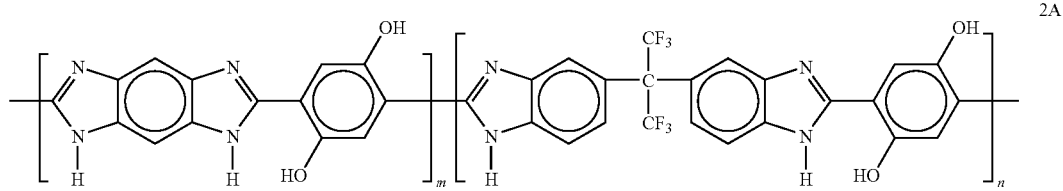

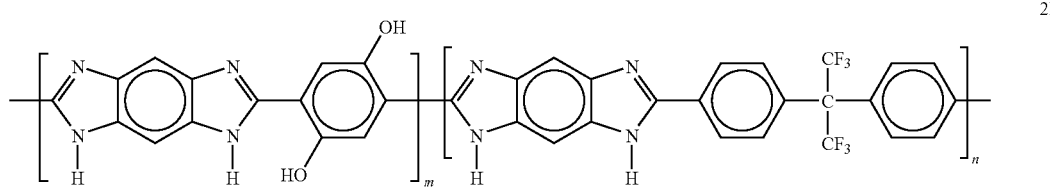

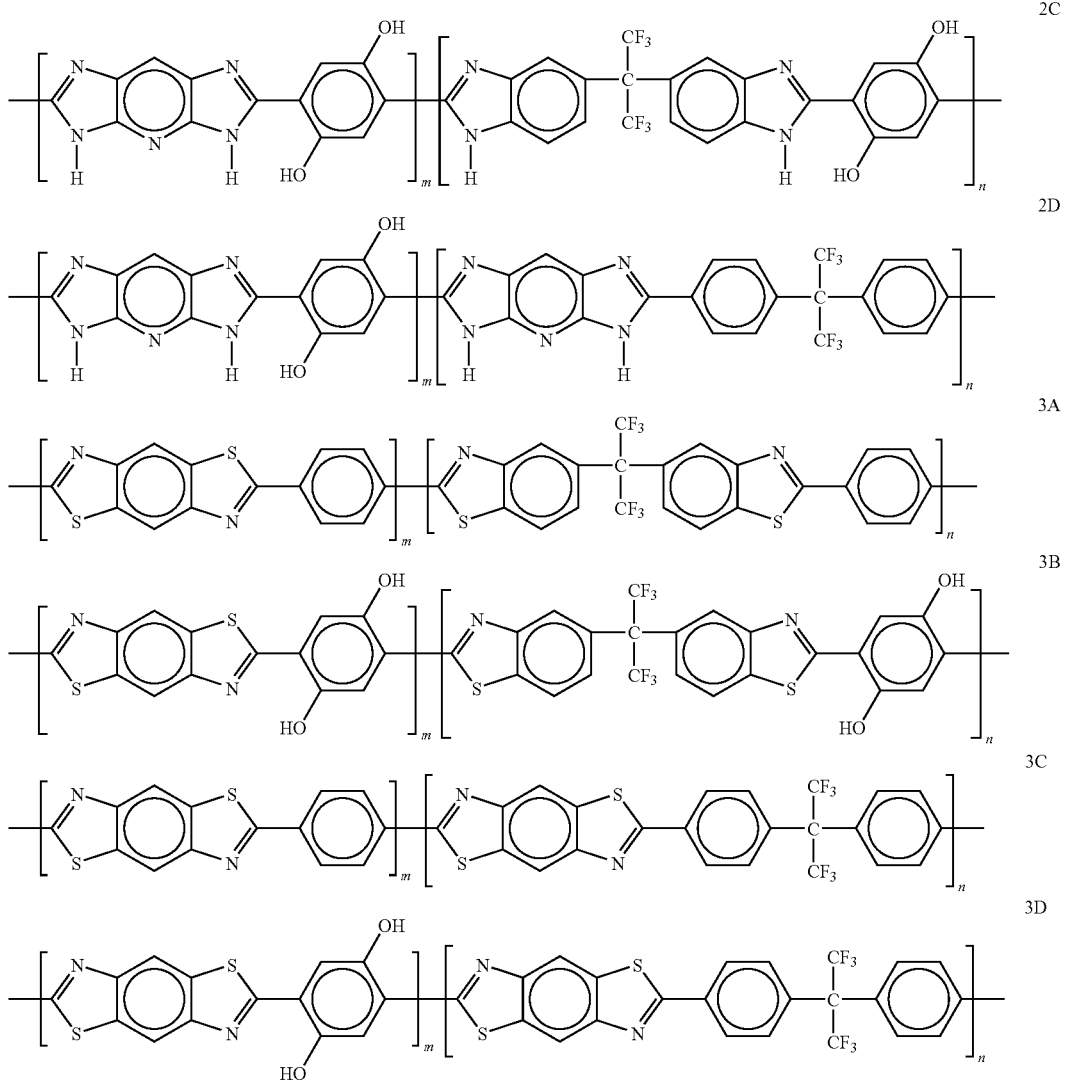

FIGS. 3A-3D illustrate an embodiment in which the thiazole rings in the bisbenzothiazole moieties have a trans orientation. By using 2,2-bis(4-amino-3-mercapto phenyl)hexafluoropropane, the corresponding cis-oriented copolymer can be obtained.

For comparison purposes in flammability measurements of the PBO-based copolymers to determine their fire resistance, both PBO and another rigid-rod homopolymer, poly(2,5-dihydroxy-p-phenylenebenzobisimidazole) (DiOH-PBI) were also evaluated.

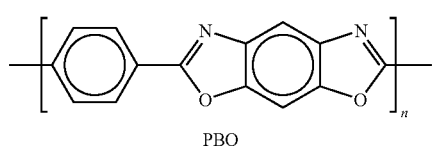
PBO

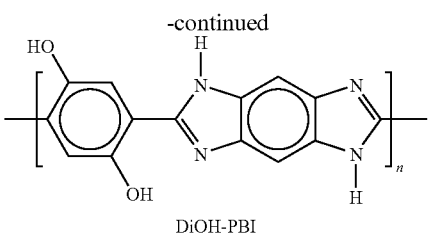
DiOH-PBI

The copolymer dopes in polyphosphoric acid were extruded into fibers in a continuous process using a dry jet-wet spinning technique. The polymers were spun into fibers from the lyotropic liquid crystalline phase of the polymer in PPA. The tensile properties were evaluated for both "as spun" and "heat-treated" or "annealed" fibers.

Flammability tests were conducted on the fibrous copolymers isolated from the polymerization reaction. The flammability/heat release behavior of the random copolymers generated in this invention, measured by micro-combustion calorimetry (ASTM D 7309), was compared with that measured for PBO and DiOH-PBI polymers.

A synthesis of a (90/10) random copolymer composition incorporating the rigid-rod PBO unit or the DiOH-PBO rigid-rod unit and the flexible 6F-PBO linker is shown in Equation 1. The procedure can be applied to the synthesis of random PBO copolymers varying both m and n over a desired range of compositions, e.g., 90/10 to 70/30. The procedure can also be adapted to the synthesis of PBI and PyBI copolymers with dihydroxy pendants and is also applicable to the preparation of the corresponding PBZT copolymers.

A generalized synthesis of PBO-6F-DPPBO copolymer, which is structurally isomeric to PBO-6F-PBO, is shown in Equation 2. A wide range of copolymer compositions can be prepared by varying m and n. The procedure can also be adapted to the synthesis of PBI and PyBI copolymers with the dihydroxy pendants and is also applicable to the preparation of the corresponding PBZT copolymers.

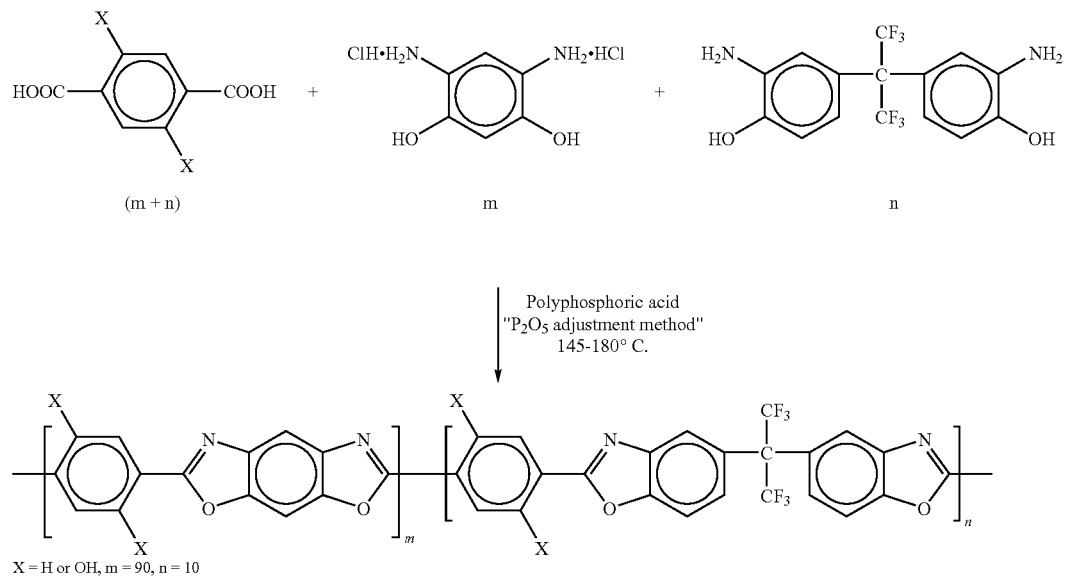

Equation 1. Synthetic Scheme for PBO-6F-PBO and DiOH-PBO-6F-PBO Copolymer Compositions

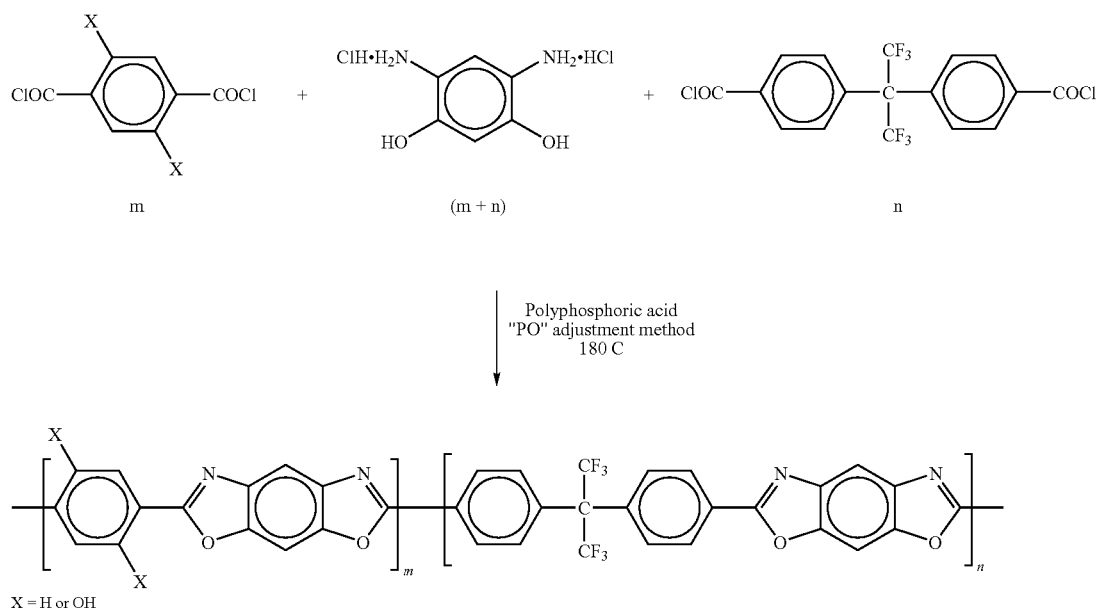

Equation 2. Generalized Synthetic Scheme for PBO-6F-DP-PBO Copolymer Compositions In some of the syntheses described above (see Equation 2), the aromatic diacid chloride rather than the diacid can be used. The polymer synthesis involved the use of "$P_2O_5$ adjustment method" for the polymerization reaction. Accordingly, freshly prepared polyphosphoric acid with 77% $P_2O_5$ content was utilized for the "degassing" or "dehydrochlorination" of 4,6-diaminoresorcinol dihydrochloride in the reaction mixture at temperature up to 105° C. Further $P_2O_5$ was added to polyphosphoric acid to increase its $P_2O_5$ content to 83% before raising the reaction temperature up to 180° C. for polymerization. Detailed procedures for the preparation of these polymers are provided in the examples described later.

The introduction of 10 mole % of the flexible 6F-PBO copolymer unit was not found to alter the PBO solution properties in PPA considerably. The lyotropic liquid crystalline phase, characteristic of PBO, was still evident from the stir opalescence of the polymer dope observed during the reaction and the optical birefringence exhibited by the polymer dope sample that was sealed between glass slides and examined under polarizing optical microscopy. The polymer concentrations in the polyphosphoric acid polymerization medium were in the range of 10-14 wt %, facilitating the formation of the anisotropic phase. A large part of the polymer dope generated was set aside for fabrication into fibers; the bulk, fibrous polymer samples were isolated from the rest of the dope after precipitation in water, soxhlet-extraction with water, followed by 5% aqueous base and again, water and dried. They were found to be of high molecular weight as evidenced by dilute solution viscosity measurements in MSA (methanesulfonic acid) (Table 1). The properties of the rigid-rod polymer DiOH-PBI are also described, for comparison. In the embodiments described, the copolymers have an intrinsic viscosity (dl/g, MSA, 30° C.) of about 3.7 to 7.4 and, more particularly, up to 9.0. The fibrous polymer samples, isolated after working up the reaction mixture, were utilized for both thermal characterization and flame resistance studies.

Equations 1 and 2, (m+n) equals 100 and the quantity "n" corresponds to the proportion of the 6F unit present in the copolymer. In the current invention, n can vary from about 10 mole % to about 20 mole % and more typically, up to a maximum of about 30 mole %. Higher values of "n" will add more than desired proportions of the flexibilizing 6F unit and in some cases will tend to be detrimental to rigid-rod polymer high performance properties. While an increase in fiber elongation may result, there may be a reduction in fiber tensile modulus and strength. Mechanical properties may be profoundly affected presumably due to the inability of the rigid-rod component to align in solution to form the anisotropic phase, when the 6F "kink" is increased beyond a certain proportion.

TABLE 1

Solution properties of the polymer compositions

| Polymer description | Polymer solubility | Intrinsic viscosity (dl/g, MSA, 30° C.) |
|---|---|---|
| DiOH-PBI | PPA, MSA | 9.4 |
| PBO-6F-PBO (90/10) | PPA, MSA | 7.4 |
| PBO-6F-DPPBO (90/10) | PPA, MSA | 3.7 |
| DiOH-PBO-6F-PBO (90/10) | PPA, MSA | 9.0 |

The fibrous polymers described above exhibited high thermal and thermo-oxidative stabilities, as indicated by thermogravimetric (TGA) analyses of the samples in nitrogen and in air (Table 2). An illustrative example for the thermal stability of the copolymer is also depicted in FIG. 1.

TABLE 2

Thermal properties of the polymers

| Polymer description | $T_d$*, in nitrogen, ° C. | | $T_d$*, in air, ° C. | |
|---|---|---|---|---|
| | onset | 5% wt. loss | onset | 5% wt. loss |
| DiOH-PBI** | 450 | 500 | 400 | 470 |
| PBO-6F-PBO (90/10) | 550 | 600 | 525 | 550 |
| PBO-6F-DPPBO (90/10) | 535 | 620 | 520 | 570 |
| DiOH-PBO-6F-PBO (90/10) | 505 | 540 | 480 | 525 |

*Degradation temperature
**Rescan after first scan up to 350° C. to remove chemically bound water The polymer dopes were continuously spun into fibers using a dry jet wet spinning technique in the temperatures range 90-100° C. and at a pressure in the 1000-1200 psi range. The fibers, which were spun with high draw ratios in the 20/1 to 30/1 range, were coagulated in de-ionized, distilled water before drying in air. In the case of the PBO-6F-PBO (90/10) copolymer, some of the wet fibers, after initial water coagulation, were also immersed in a dilute ammonium hydroxide bath (base treatment to remove residual acid) followed by immersion in deionized, distilled water before drying. The mechanical properties of both as spun and heat treated fibers (300° C., 1 min. residence time in a tube oven) as well as those of base-treated and water-treated fibers were evaluated using a Tinius Olsen tensile tester. Table 3 lists the average measured fiber tensile properties of PBO-6F-PBO (90/10) and DiOH-6F-PBO (90/10) copolymers as well as those of the rigid-rod polymer DiOH-PBI. The average diameters of the as spun copolymer and rigid-rod polymer fibers were about 25-60μ, depending on spinning conditions and draw ratios.

TABLE 3

Average fiber tensile properties

| Polymer Fiber | As spun | | | Heat treated (300° C., 1 min.) | | |
|---|---|---|---|---|---|---|
| | σ (GPa) | ε (%) | E (GPa) | σ (GPa) | ε (%) | E (GPa) |
| DiOH-PBI | 1.04 | 2.5 | 101 | 1.81 | 1.3 | 166 |
| PBO-6F-PBO (90/10) (base) | 1.61 | 1.7 | 166 | 2.79 | 1.2 | 276 |
| PBO-6F-PBO (90/10) (water) | 2.68 | 2.0 | 164 | 3.77 | 1.2 | 336 |
| DiOH-PBO-6F-PBO (90/10) (base) | 2.69 | 1.2 | 257 | 1.51 | 0.70 | 242 |
| DiOH-PBO-6F-PBO (90/10) (water) | 2.57 | 1.2 | 247 | 1.50 | 0.60 | 249 |

The measured tensile strength (σ) and tensile modulus (E) were high, and, in some cases, exceptional; in all the cases, low elongation at break (∈) was observed.

In general, heat treatment (for example, 300° C., 1 min.) of these fibers resulted in the enhancement of axial tensile properties. For instance, the average tensile modulus values of 276 and 336 GPa measured for PBO-6F-PBO (90/10) base-treated and water-treated fibers after heat treatment, are comparable to or exceed the values reported for commercial PBO (Zylon) fibers. The tensile strengths (2.79 and 3.77 GPa respectively) were also remarkable for this copolymer composition. Lower strain values resulted, in the case of the heat treated polymer fibers. It is reasonable to assume that slightly higher elongation at break or elastic strain values, relative to pure rigid-rod polymer fibers, as desired for ballistic vest applications, would potentially result in the case of copolymer compositions with the introduction of a larger extent of "kinks" in the rigid-rod copolymer structure with proportions of the flexible copolymer unit (n) in the backbone of about 20 to 25 mole % and, more particularly, up to about 30 mole %.

Flammability tests were conducted utilizing Microcombustion Calorimeter (MCC) which measures inherent flammability based on oxygen consumption calorimetry. The sample is pyrolyzed under an inert gas at a fast heating rate, and the gases from the thermally decomposed product are then pushed into a 900° C. combustion furnace where they are mixed with oxygen. After the gases from the pyrolyzed sample are combusted in the 900° C. furnace, they are then flowed onto an oxygen sensor. The amount of oxygen consumed during that combustion process equals the heat release for the material at that temperature. Typical results from the MCC focus on such heat release measurements. The lower peak heat release capacity (HRC) and lower total heat release values are correlated with lower flammability. The flammability data of the various copolymers generated in certain embodiments of this invention as well as that of DiOH-PBI polymer are compared with the baseline value for base-treated PBO fibers, tested in this invention. Table 4 summarizes the flame resistance data for these polymers. Reported values were averaged over three samples for each polymer tested at 1° C./sec heating rate under nitrogen from 300 to 950° C. using method B of ASTM D7309 (pyrolysis under nitrogen).

TABLE 4

Polymer flammability data by Microcombustion Calorimetry

| Polymer description | Char yield (%) | HRC* peak(s) value (J/g-k) | Total HR** (KJ/g) | Heat of complete combustion (KJ/g) |
|---|---|---|---|---|
| Base-treated PBO | 64.6 | 41.1 | 3.0 | 8.5 |
| PBO-6F-PBO (90/10) | 68.0 | 29.8 | 2.5 | 7.7 |
| PBO-6F-DPPBO (90/10) | 65.4 | 29.4 | 2.5 | 7.1 |
| DiOH-PBO-6F-PBO (90/10) | 56.3 | 12.7 | 1.6 | 3.7 |
| DiOH-PBI | 48.0 | 10.2 | 2.8 | 5.3 |
| Nylon-6 | 0.6 | 534 | 28 | 28.2 |
| PET | 11.4 | 356 | 16 | 18.1 |

*Heat release capacity
**Total heat release

In general, the PBO and PBI (polybenzimidazole) class of materials are known for their flame/heat-resistance. Their HRC peak values are at least one order of magnitude lower than those of commercial thermoplastics such as nylon-6 and polyester (PET) fibers, evaluated under the same conditions (Table 4). The superior flame resistance characteristics of the PBO-like polymers described herein are clearly borne out by their considerably lower HRC peak values as well as lower total heat release and heat of complete combustion values. The char yields from the polymeric compositions described in this invention are also much higher than the negligible to low char yields obtained from Nylon-6 and PET.

The micro-combustion calorimetric studies reported herein reveal that the copolymers PBO-6F-PBO (90/10) and PBO-6F-DPPBO (90/10) are less flammable than PBO, based on their lower peak HRC values (29.8 or 29.4 vs 41.1 (J/g-k) for PBO). Better flame resistance is displayed by both the DiOH-PBI polymer and the DiOH-PBO-6F-PBO (90/10) copolymer, with exceptionally low HRC peak values of 10.2 and 12.7 (J/g-k) respectively. One of the lowest values for total heat release as well as the lowest values for both total heat release and the heat of total combustion were measured for the DiOH-PBO-6F-PBO (90/10) copolymer. This indicates that the copolymer compositions reported herein as well as DiOH-PBI can be potentially utilized in fire safety/protection applications. Fibrous polymers and copolymers in accordance with the embodiments of the invention are characterized by HRC peak values of about 29.8 to 12.7 J/g-k and, more particularly, to 10.2 J/g-k.

The following examples illustrate particular embodiments of the invention in more detail. Unless otherwise indicated, all percentages are by weight.

Example 1

Poly(p-phenylenebenzobisoxazole) Copolymer Incorporating Benzoxazole with Hexafluoroisopropylidene Units (PBO-6F-PBO (90/10))

Into a resin flask fitted with a high torque mechanical stirrer, a nitrogen inlet/outlet adapter and a side-opening for addition, was placed terephthaloyl chloride (4.0604 g, 0.02 mole), 4,6-diaminoresorcinol dihydrochloride (3.8351 g, 0.018 mole) and 2,2-bis(3-amino-4-hydroxyphenyl) hexafluoropropane (0.7325 g, 0.002 mole). 21.74 g of a freshly prepared 77% PPA was added to the flask. The monomers were stirred in PPA and the mixture was dehydrochiorinated over a period of 24 h under a nitrogen flow after slowly raising the reaction temperature to 105° C., to avoid foaming. The mixture was cooled and 9.45 g $P_2O_5$ was added to provide PPA with 83% $P_2O_5$ content and to ensure a final polymer concentration of 14 wt % in PPA. The mixture was maintained and stirred at 100° C. to ensure good homogeneity and the temperature was slowly raised to 165° C. and the polymerization was run overnight. Stir opalescence characteristic of the anisotropic phase of the polymer dope was observed. The reaction was continued at a final temperature of 180° C. for 24 h. Most of the polymer dope (~30 g) was taken out for fiber spinning. In polarizing optical microscopy, a sample of the dope, sealed between glass slides, was found to exhibit optical birefringence; the persistence of the initially observed optical texture, even after several days, was strongly indicative of the lyotropic liquid crystalline behavior of the rigid-rod copolymer. The rest of the dope in the flask was Placed in large quantities of water and the fibrous polymer was chopped up in a Waring blender. The polymer was filtered, successively soxhlet-extracted with water, dilute ammonium hydroxide solution and again water, before it was dried in vacuo at 100° C. over 24 h.

Example 2

Poly(p-phenylenebenzobisoxazole) Copolymer (PBO-6F-DPPBO (90/10)) Derived from Terephthaloyl Chloride, 4,6-diaminoresorcinol dihydrochloride and the Diacid Chloride of bis(4-carboxyphenyl) hexafluoropropane Into a resin flask fitted with a high torque mechanical stirrer, a nitrogen inlet/outlet adapter and a side-opening for addition, was placed terephthaloyl chloride (3.6544 g, 0.018 mole), 4,6-diaminoresorcinol dihydrochloride (4.2612 g, 0.02 mole) and the diacid chloride of 2,2-bis(4-carboxyphenyl)hexafluoropropane (0.8582 g, 0.002 mole) and 21.74 g of a freshly prepared 77% PPA was added to the flask. The monomers were stirred in PPA and the mixture was dehydrochlorinated over a period of 24 h under a nitrogen flow after slowly raising the reaction temperature to 105° C., to avoid foaming. The mixture was cooled and 9.45 g $P_2O_5$ was added to provide PPA with 83% $P_2O_5$ content and to ensure a final polymer concentration of 14 wt % in PPA. The mixture was maintained and stirred at 100° C. to ensure good homogeneity and the temperature was slowly raised to 165° C. and the polymerization was run overnight. Stir opalescence characteristic of the anisotropic phase of the polymer dope was observed. The reaction was continued at a final temperature of 180° C. for 24 h. Most of the polymer dope (~30 g) was taken out for fiber spinning. In polarizing optical microscopy, a sample of the dope, sealed between glass slides, was found to exhibit optical birefringence; the persistence of the initially observed optical texture, even after several days, was strongly indicative of the lyotropic liquid crystalline behavior of the rigid-rod copolymer. The rest of the dope in the flask was placed in large quantities of water and the fibrous polymer was chopped up in a Waring blender. The fibrous polymer was filtered, successively soxhlet-extracted with water, dilute ammonium hydroxide solution and again water, before it was dried in vacuo at 100° C. over 24 h.

Example 3

Poly(2,5-dihydroxy-1,4-phenylenebenzobisoxazole) Copolymer Incorporating Benzoxazole with Hexatluoroisopropylidene Units (DiOH-PBO-6F-PBO (90/10))

Into a resin flask fitted with a high torque mechanical stirrer, a nitrogen inlet/outlet adapter and a side-opening for addition, was placed 2,5-dihydroxyterephthalic acid (3.9626 g, 0.02 mole), 4,6-diaminoresorcinol dihydrochloride (3.8351 g, 0.018 mole) and 2,2-bis(3-amino-4-hydroxyphenyl)hexafluoropropane (0.7325 g, 0.002 mole) and 19.96 g of a freshly prepared 77% PPA was added to the flask. The monomers were stirred in PPA and the mixture was dehydrochlorinated over a period of 24 h under a nitrogen flow after slowly raising the reaction temperature to 105° C., to avoid foaming. The mixture was cooled and 14.08 g $P_2O_5$ was added to provide PPA with 83% $P_2O_5$ content and to ensure a final polymer concentration of 14 wt % in PPA. The mixture was maintained and stirred at 100° C. to ensure good homogeneity and the temperature was slowly raised to 165° C. and the polymerization was run for 24 h at that temperature. Stir opalescence characteristic of the anisotropic phase of the polymer dope was observed. Most of the polymer dope (~35 g) was taken out for fiber spinning. In polarizing optical microscopy, a sample of the dope, sealed between glass slides, was found to exhibit optical birefringence; the persistence of the initially observed optical texture, even after several days, was strongly indicative of the lyotropic liquid crystalline behavior of the rigid-rod copolymer. The rest of the dope in the flask was placed in large quantities of water and the fibrous polymer was chopped up in a Waring blender. The polymer was filtered, successively soxhlet-extracted with water, dilute ammonium hydroxide solution and water, before it was dried in vacuo at 100° C. over 24 h.

Example 4

Poly(2,5-dihydroxy-1,4-phenylenebenzobisimidazole) polymer (DiOH-PBI)

Into a resin flask fitted with a high torque mechanical stirrer, a nitrogen inlet/outlet adapter and a side-opening for addition, was placed 2,5-dihydroxyterephthalic acid (7.9252 g, 0.04 mole), 1,2,4,5-teraaminobenzene tetrahydrochloride (11.3608 g, 0.04 mole) and 21.33 g of 85% orthophosphoric acid. To this well-stirred mixture was added 14.11 g of $P_2O_5$ to provide 35.44 g of 77% PPA. The monomers were stirred in PPA and the mixture was dehydrochlorinated over a period of 24 h under a nitrogen flow after slowly raising the reaction temperature to 105° C., to avoid foaming. The mixture was cooled and 26.6 g $P_2O_5$ was added to provide PPA with 83% $P_2O_5$ content and to ensure a final polymer concentration of 14 wt % in PPA. After thorough mixing of the contents, the temperature was slowly raised to 140° C. and the polymerization was continued at this temperature for 24 h. Stir opalescence characteristic of the anisotropic phase of the rigid-rod polymer dope was observed. Most of the polymer dope (~65 g) was taken out for fiber spinning. The rest of the dope in the flask was placed in large quantities of water and the fibrous polymer was chopped up in a Waring blender. The fibrous polymer was filtered, successively soxhlet-extracted with water, dilute ammonium hydroxide solution and again water, before it was dried in vacuo at 100° C. over 24 h.

Example 5

Dry-Jet Wet Spinning of the PPA Dope of PBO-6F-PBO (90/10)

The copolymer dope from EXAMPLE 1 was fabricated into continuous monofilament fibers using by a dry jet wet spinning method in a custom-made device, fitted with a 20 mil diameter spinnerette. Fiber spinning was accomplished at a temperature of 90° C. and under a pressure of 1100 psi. A draw ratio of 30 was maintained for the spinning process. The fibers were extruded through an air gap directly into a coagulation bath with distilled water and wound on spools. A spool of fibers was soaked in distilled water for a few days to remove residual acid and then air dried. A separate spool of fibers was successively soaked in water, ~5% ammonium hydroxide and water and then air dried. The average diameter of the as spun fibers was measured to be 25μ. The mechanical properties of both as spun and heat treated fibers were evaluated.

Example 6

Dry-Jet Wet Spinning of the PPA Dope of DiOH-PBO-6F-PBO (90/10)

The copolymer dope from EXAMPLE 3 was fabricated into continuous monofilament fibers using by a dry-jet wet spinning method in a custom-made device, fitted with a 20 mil diameter spinnerette. Fiber spinning was accomplished at a temperature of 100° C. and under a pressure of 1050 psi. A draw ratio of 20 was maintained for the spinning process. The fibers were extruded through an air gap directly into a coagulation bath with distilled water and wound on spools. A spool of fibers was soaked in distilled water for a few days to remove residual acid and then air dried. A separate spool of fibers was successively soaked in water, ~5% ammonium hydroxide and water and then air dried. The average diameter of the as spun fibers was measured to be 60μ. The mechanical properties of both as spun and heat treated fibers were evaluated.

Example 7

Dry-Jet Wet Spinning of the PPA Dope of DiOH-PBI

The rigid-rod polymer dope from EXAMPLE 4 was fabricated into continuous monofilament fibers using by a dry jet wet spinning method in a custom-made device, fitted with a 20 mil diameter spinnerette. Fiber spinning was accomplished at a temperature of 100° C. and under a pressure of 1100 psi. A draw ratio of 20 was maintained for the spinning process. The fibers were extruded through an air gap directly into a coagulation bath with distilled water and wound on spools. Spools of fibers were soaked in distilled water for a few days to remove residual acid and then air dried. The average diameter of the as spun fibers was measured to be 60μ. The mechanical properties of both as spun and heat treated fibers were evaluated.

Example 8

Flammability Testing of DiOH-PBO-6F-PBO (90/10) Fibrous Copolymer Sample Per Micro Combustion Calorimetry 5.5 mg (+/−0.2 mg) of a fibrous sample of the Di-OH-PBO-6F-PBO copolymer was weighed out and placed into alumina sample crucibles for micro combustion calorimetry testing. These samples were then placed into the pryolyzer probe of a MCC-1 testing instrument (Govmark, Farmingdale, N.Y.) and were pyrolyzed at a 1° C./sec heating rate under nitrogen from 300 to 950° C. using method B of ASTM D7309). Each sample was run in triplicate to evaluate reproducibility of the flammability measurements. At the end of each analysis, the sample crucibles were weighed to determine the amount of residual char from the test. From the test results and from the char weight measurement, heat release capacity, total heat release, heat of complete combustion, and char yield were calculated. These results were compared against other PBO materials tested in the same manner and the results indicated that DiOH-PBO-6F-PBO showed significant reductions in heat release and was comparable to DiOH-PBI in its low flammability.

Having described the invention in detail and by reference to particular examples thereof, it will be apparent that numerous variations and modifications are possible without departing from the invention as defined by the following claims.

What is claimed is:

1. A polymer of the formulas A, B, C or D

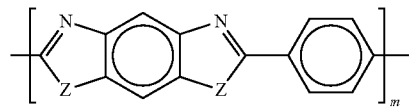

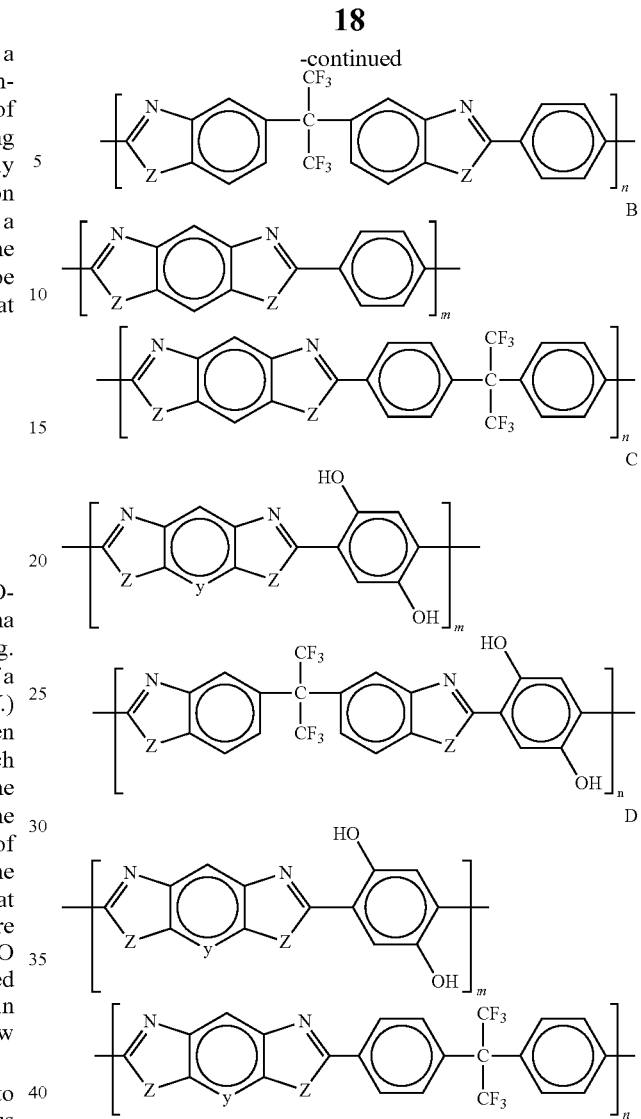

where Z is —O— or —S— in the case of formulas A and B; and Z is —O—, —S— or —NH— in the case of formulas C and D; and in formulas C and D, when Z is —NH—, y can be —C= or —N= and when Z is —O— or —S—, y is —C=; and when Z is —S—, the bisthiazole rings in the benzobisthiazole moieties may have a cis or a trans orientation; m is about 70 to 90 mole % and n is about 10 to 30 mole %.

2. The polymer of claim 1 wherein the polymer has an intrinsic viscosity of about 3.7 dl/g to about 9.0 dl/g.

3. A polymer of claim 1 having the formula 1A, 1B, 1C, or 1D

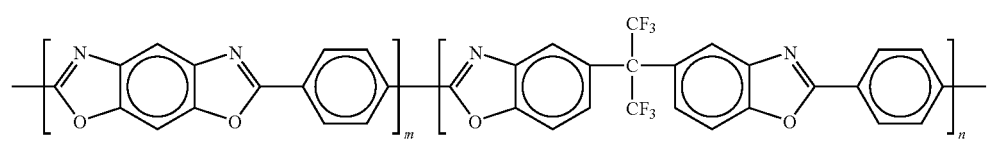

PBO-6F-PBO

-continued

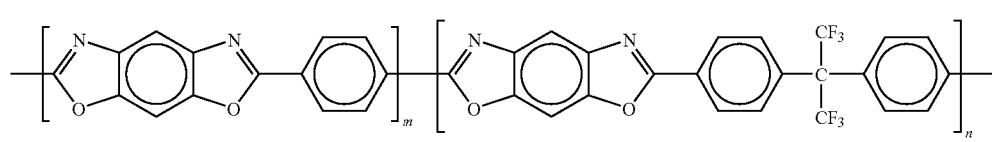
PBO-6F-DPPBO

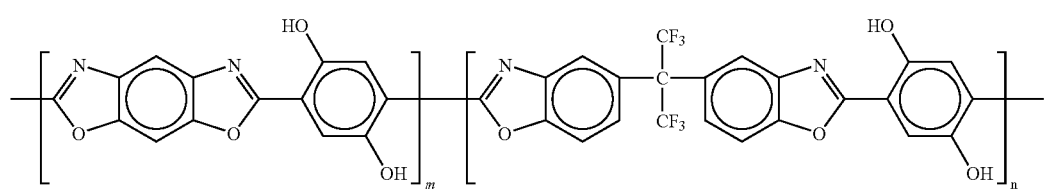
DiOH-PBO-6F-PBO

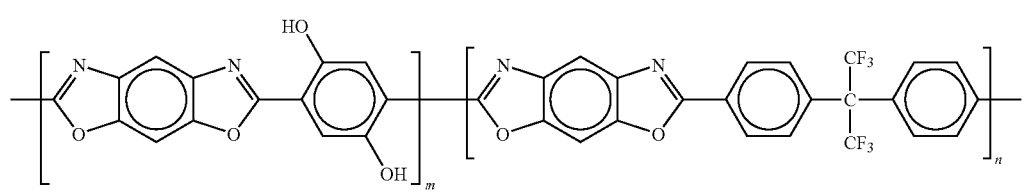
DiOH-PBO-6F-DPPBO wherein m is about 70 to 90 mole % and n is about 10 to 30 mole %.

4. The polymer of claim 3 wherein the polymer has the formula 1A.

5. The polymer of claim 3 wherein the polymer has the formula 1B.

6. The polymer of claim 3 wherein the polymer has the formula 1C.

7. The polymer of claim 3 wherein the polymer has the formula 1D.

8. The polymer of claim 3 wherein the polymer is a lyotropic liquid crystal.

9. The polymer of claim 1 wherein the polymer has the formula 2A, 2B, 2C or 2D

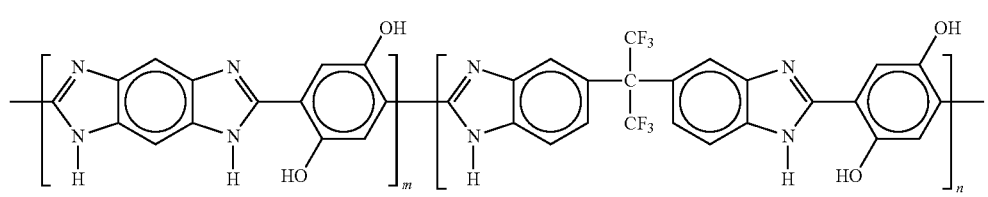

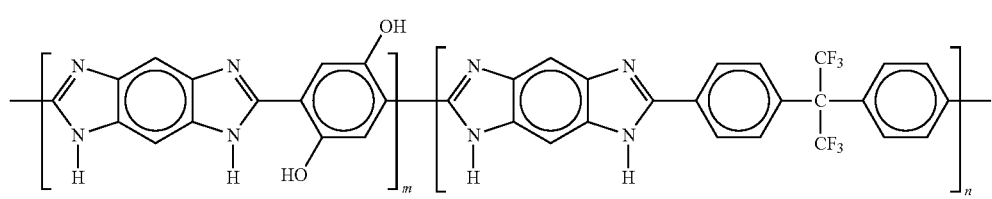

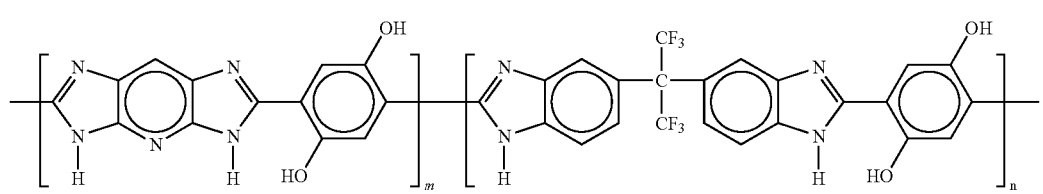

-continued
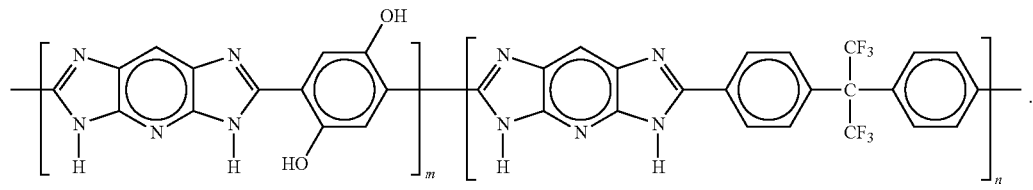
10. The polymer of claim 1 wherein the polymer has the formula 3A, 3B, 3C or 3D
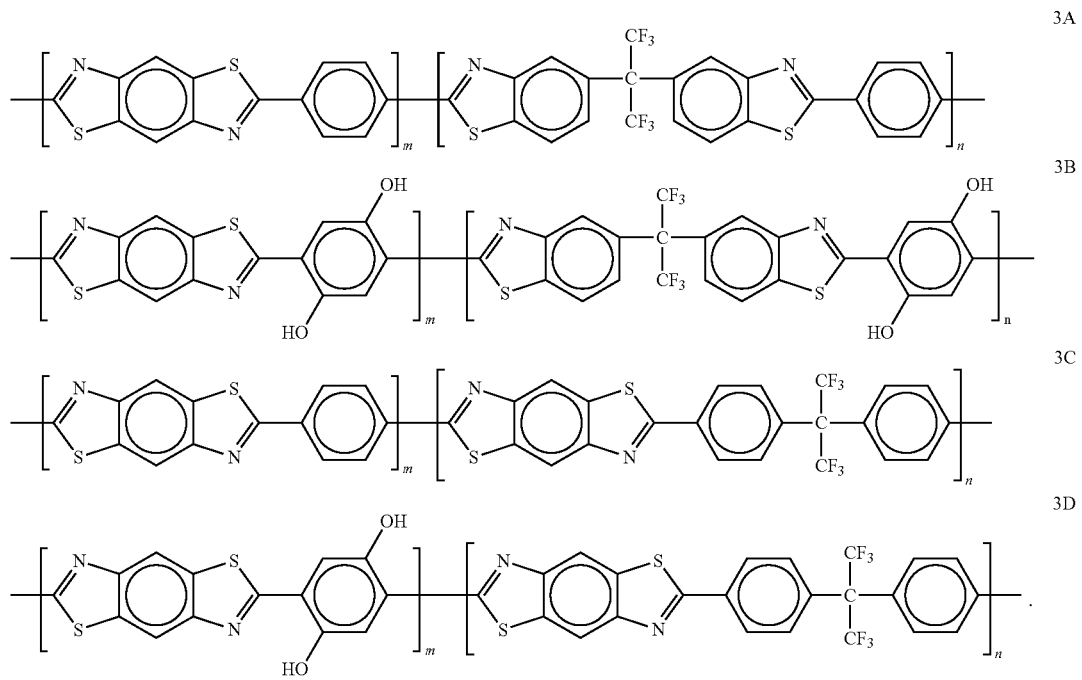
11. A fiber formed from a polymer of the formula A, B, C or D
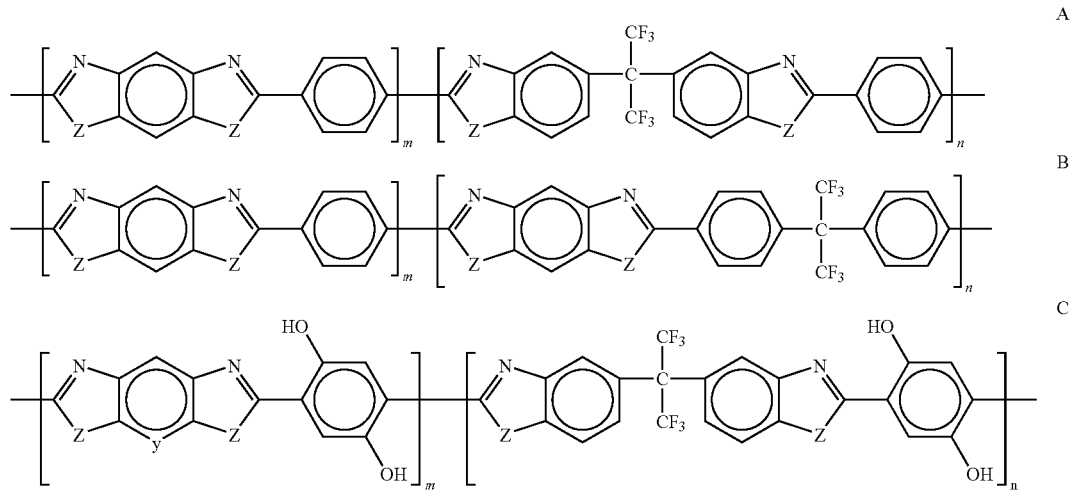

-continued

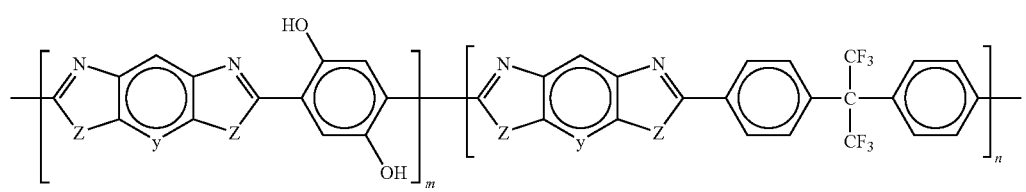
D where Z is —O— or —S— in the case of formulas A and B; Z is —O—, —S— or —NH— in the case of formulas C and D; and in formulas C and D, when Z is —NH—, y can be —C═ or —N═ and when Z is —O— or —S—, y is —C═; and when Z is —S—, the bisthiazole rings in the benzobisthiazole moieties may have a cis or a trans orientation; m is about 70 to 90 mole % and n is about 10 to 30 mole %.

12. The fiber of claim 11 wherein the polymer has an intrinsic viscosity of about 3.7 dl/g to 9.0 dl/g.

13. The fiber of claim 11 wherein the fiber is formed from a polymer of the formula 1A, 1B, 1C or 1D 14. The fiber of claim 13 wherein the polymer has the formula 1A.

15. The fiber of claim 13 wherein the polymer has the formula 1B.

16. The fiber of claim 13 wherein the polymer has the formula 1C.

17. The fiber of claim 13 wherein the polymer has the formula 1D.

18. The fiber of claim 11 wherein the polymer is a lyotropic liquid crystal.

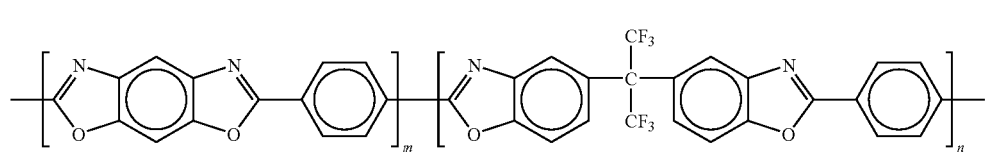
1A

PBO-6F-PBO

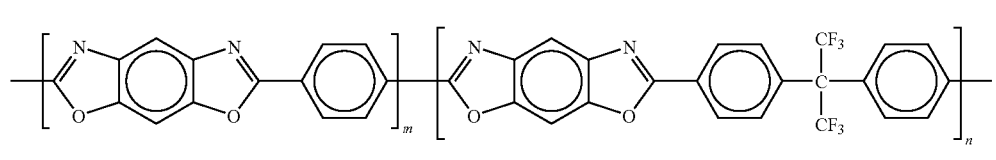
1B

PBO-6F-DPPBO

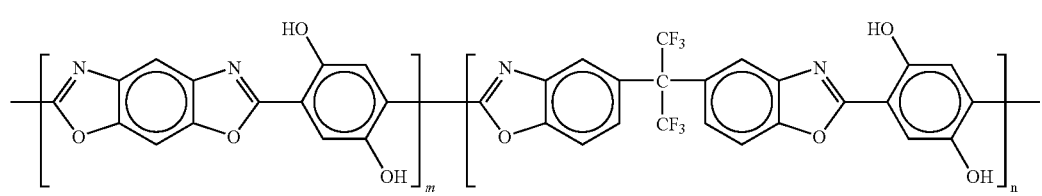
1C

DiOH-PBO-6F-PBO

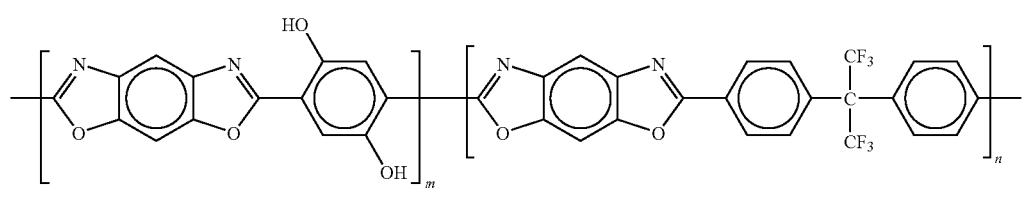
1D

DiOH-PBO-6F-DPPBO wherein m is about 70 to 90 mole % and n is about 10 to 30 mole %.

19. The fiber of claim 11 wherein the polymer has the formula 2A, 2B, 2C, or 2D

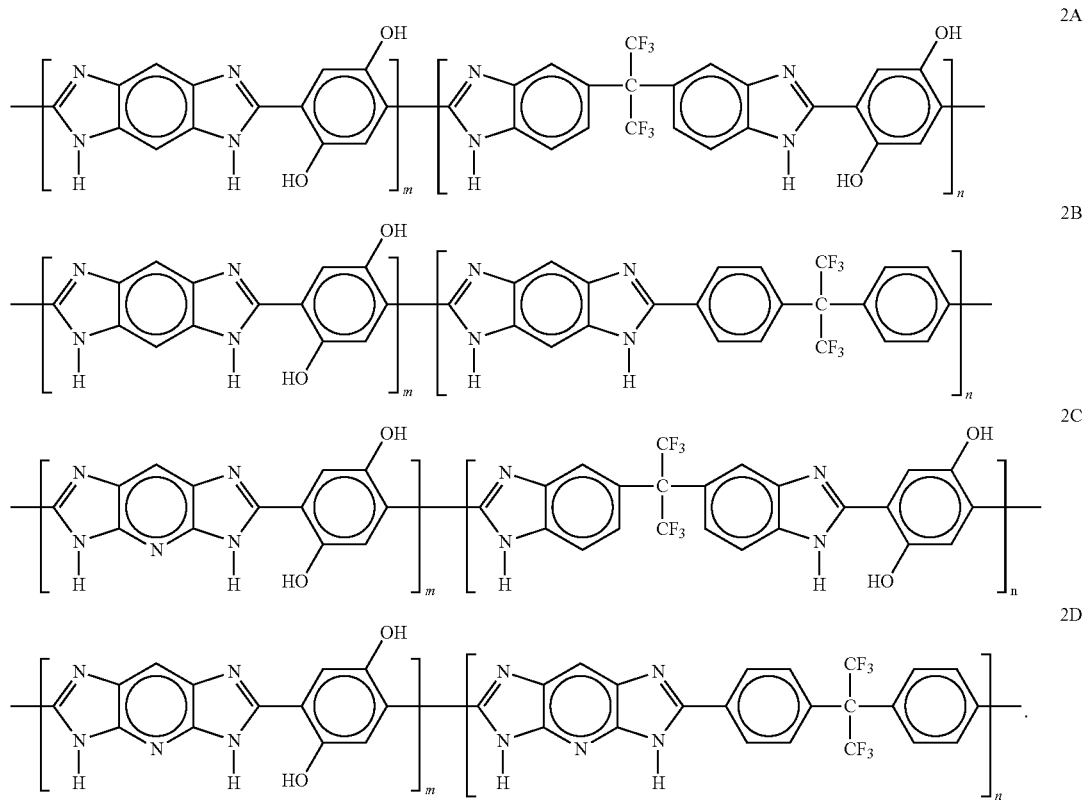
2A
2B
2C
2D
20. The fiber of claim 11 formed from the polymer of formula 3A, 3B, 3C or 3D
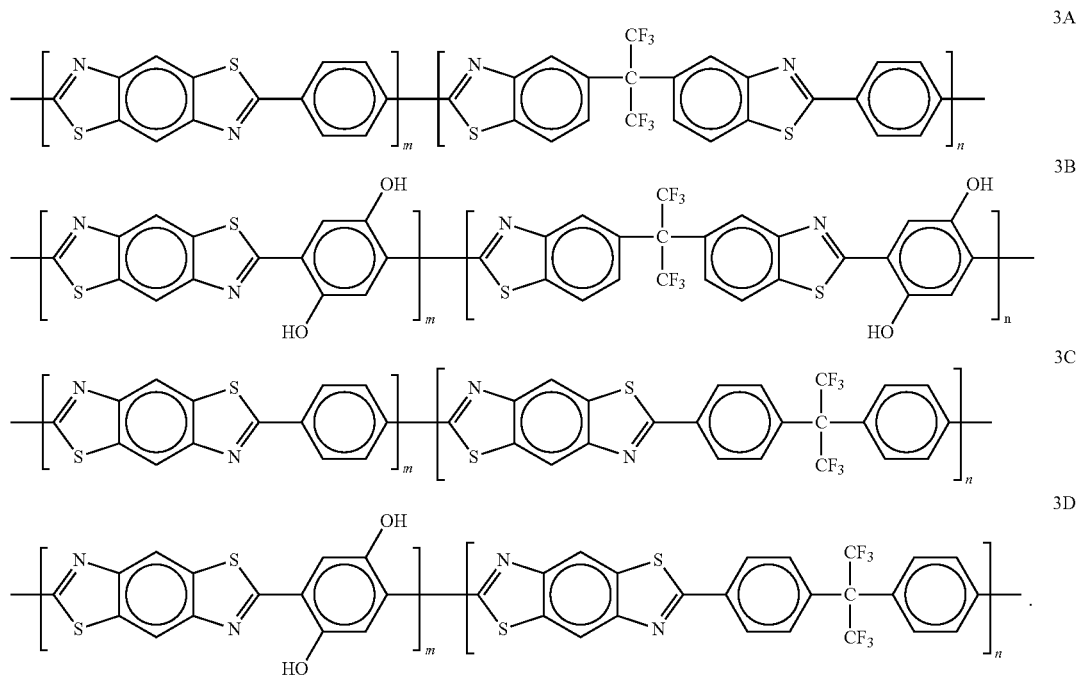
3A
3B
3C
3D
21. A flame resistant material formed from a polymer of the formula A, B, C, or D

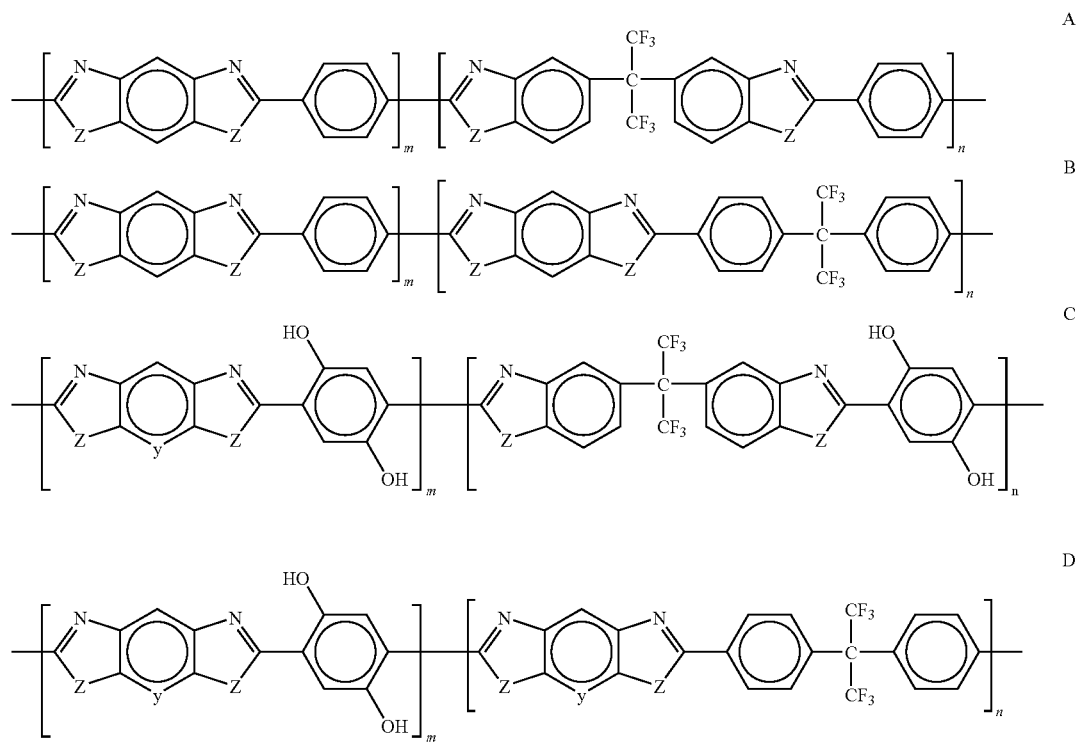

where Z is —O— or —S— in the case of formulas A and B; and Z is —O—, —S— or —NH— in the case of formulas C and D; and in formulas C and D, when Z is —NH—, y can be —C= or —N= and when Z is —O— or —S—, y is —C=; and when Z is —S—, the bisthiazole rings in the benzobisthiazole moieties may have a cis or a trans orientation; m is about 70 to 90 mole % and n is about 10 to 30 mole %.

22. The flame resistant material of claim 21 wherein the polymer is the formula 1A, 1B, 1C or 1D

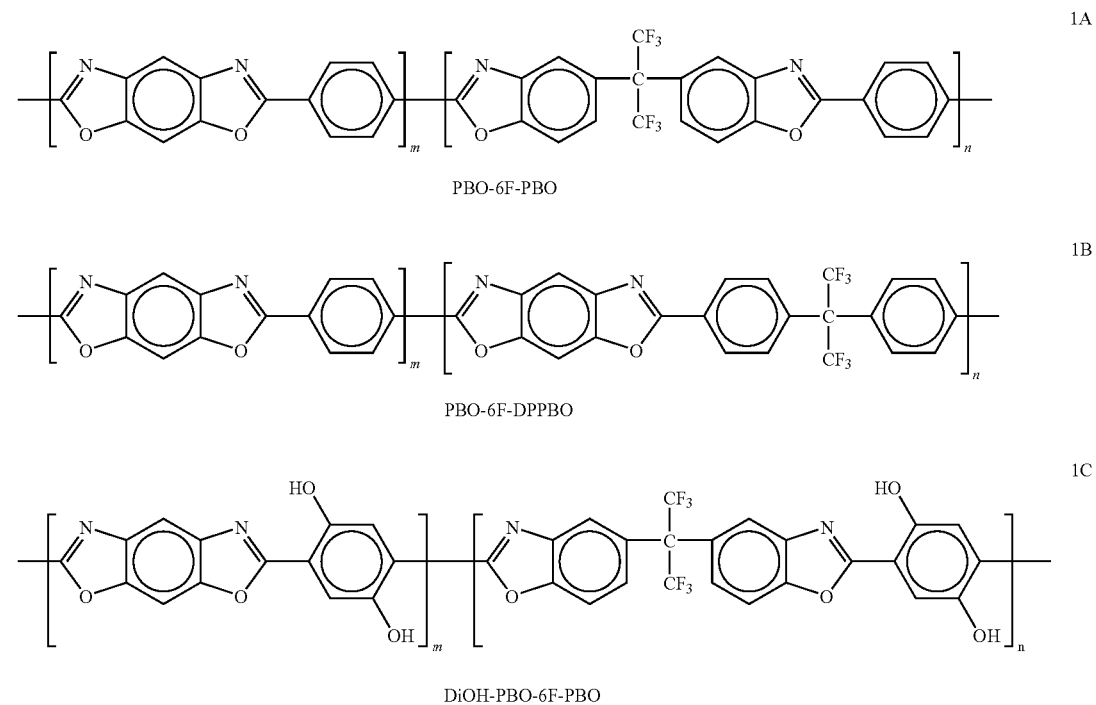

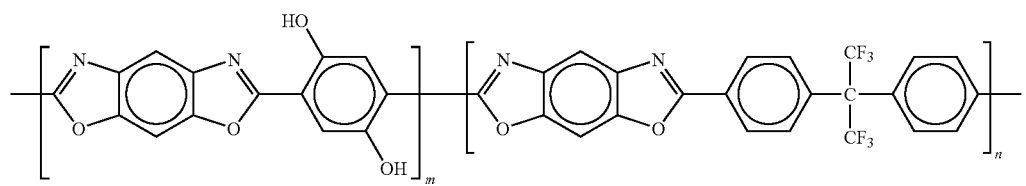

DiOH-PBO-6F-DPPBO wherein m is about 70 to 90 mole % and n is about 10 to 30 mole %.

23. The flame resistant material of claim 21 wherein the polymer has the formula 1A.

24. The flame resistant material of claim 21 wherein the polymer has the formula 1B.

25. The flame resistant material of claim 21 wherein the polymer has the formula 1C.

26. The flame resistant material of claim 21 wherein the polymer has the formula 1D.

27. The flame resistant material of claim 21 wherein the polymer has the formula 2A, 2B, 2C or 2D

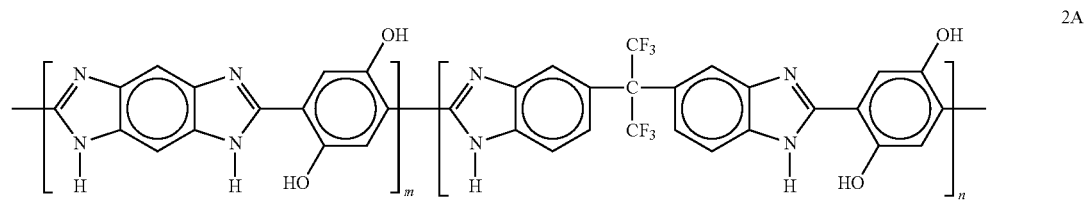

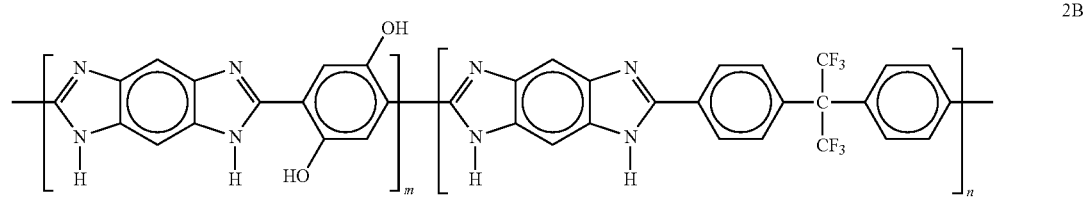

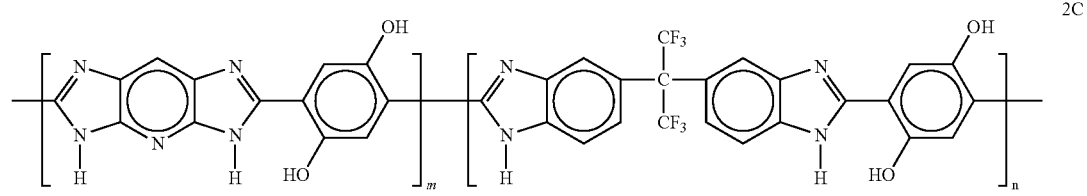

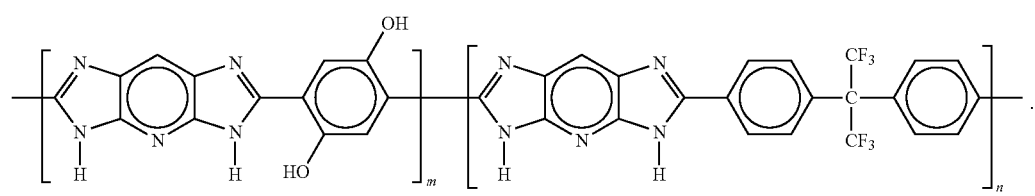

28. The flame resistant material of claim 21 wherein the polymer has the formula 3A, 3B, 3C or 3D
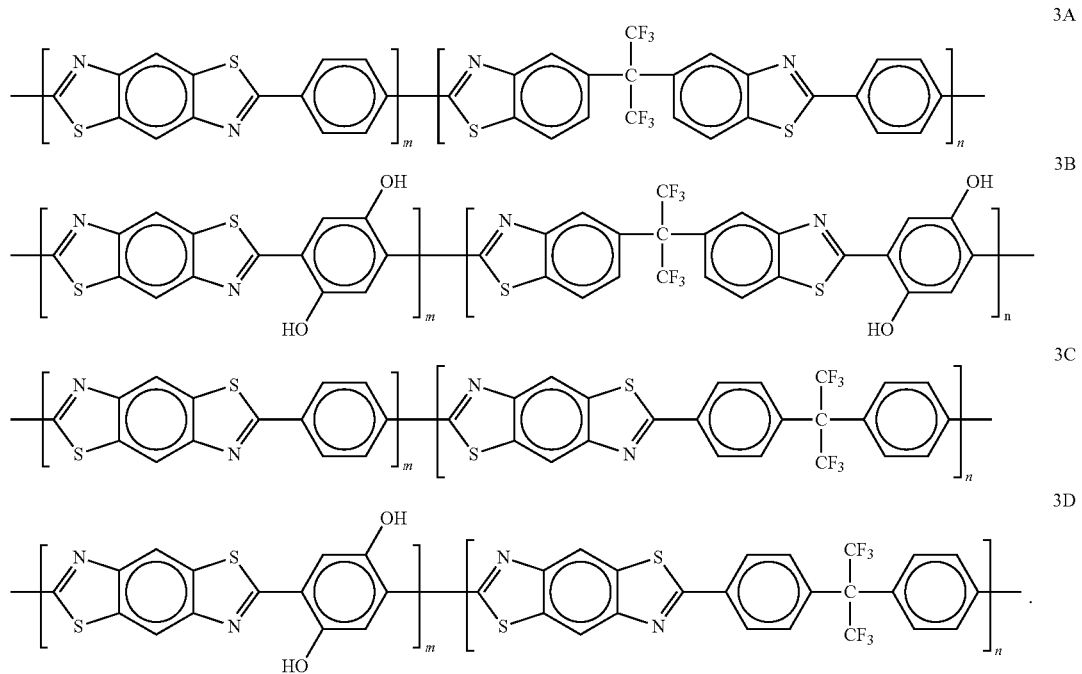
29. The flame resistant material of claim 21 wherein the material is a fabric.
* * * * *